Oct. 23, 1934. K. KAMMER 1,977,946
APPARATUS FOR CONNECTING TOGETHER INDIVIDUAL ARTICLES
Filed Feb. 25, 1932 2 Sheets-Sheet 1

Inventor:
Karl Kammer
By [signature] Attorney

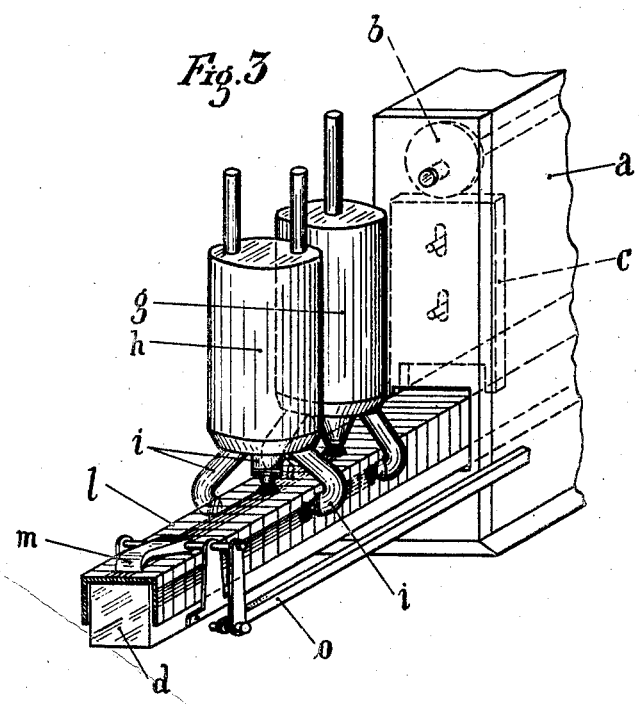

Patented Oct. 23, 1934

1,977,946

UNITED STATES PATENT OFFICE 1,977,946

APPARATUS FOR CONNECTING TOGETHER INDIVIDUAL ARTICLES

Karl Kammer, Lahr, Germany

Application February 25, 1932, Serial No. 595,205
In Germany October 31, 1931

3 Claims. (Cl. 59—72)

My present invention has for its object to provide an improved process of connecting together series of individual articles or the like for the purpose of facilitating the manipulation and securing a correct working thereof.

However my improved process is not only applicable to individual articles to be connected together temporarily, that is articles intended to be separated again from each other, but also to articles to be connected together permanently.

The temporary connection may be used for all articles to be worked in attaching or stitching tools or the like, such as nails, pins, staples, eyelets, metal chippings for window-glasses and the like. Such articles are manufactured initially individually, and the packing and insertion thereof into the working tools are very uneasy and uneconomical and require often much time, because these individual articles will mostly be lost owing to their small sizes. Parts or articles to be connected together permanently are for instance heads of dolls, teddy animals or the like, which cannot be manufactured in one piece and must be connected together along their casting seams.

It is well known to connect such articles by gluing, soldering, welding and galvanizing. However these known processes require drying, heating, cooling and in galvanizing particularly much time requiring working, whereby the articles under treatment may be partially distorted, besides the objection that not all materials are adapted to be connected together in this way.

The gluing of articles such as staples, pins, needles or the like is moreover objectionable in that the glue exposed to atmospheric influences will become brittle after a short lapse of time, whereby the articles connected together will be disconnected again upon grasping them. In soldered or welded articles there occurs a risk of oxidizing owing to the soldering flux used. Glued articles always require a certain time for drying, during which the articles may be distorted.

According to my present invention the connection of such articles is effected by metallization, for instance by Schoop's metallizing process, whereby the articles will be perfectly connected together and at the same time advantageously protected against oxidizing and rusting.

According to said process of metallizing the metal in the shape of wire or sticks will be molten in a so-called spraying pistol either directly by means of a blow-pipe flame or electricity, or indirectly by means of highly heated gases such as carbonic gas, and forced out therefrom by means of compressed air, a continuous conical jet of finely divided metal dust being thus ejected from the nozzle of the pistol and the metal particles ejected at a considerable speed forming a homogeneous metal coating on the articles treated in this way.

It is well known that even easily inflammable materials such as celluloid may be sprayed according to this process and provided with such uniform coatings as will not be possible to be obtained by gluing or soldering.

Therefore articles connected together according to my invention may be easily and regularly separated from each other, whereby the stitching tools or presses will be greatly protected against injury. Irregular connections with accumulations of glue or soldering tin may moreover modify the dimensions of the articles connected together at certain points, whereby the working tools or presses will no more incorrectly accommodate the same. On the other hand the guiding channels in such tools or presses may be easily obstructed by glue detached from the articles.

The connections of all parts according to my invention has the advantage that the metal applied by means of the said metal spraying process does not occasion the heating of the parts to be connected together, the articles treated forming a unit immediately after the spraying operation adapted to be packed at once. Therefore in the manufacture of the well known staples for instance, as well as other similar articles, it will be possible to manufacture, connect and pack staples in permanent succession in a single machine, as there will be no loss of time for drying as for glued staples, and no loss of time for cooling as for articles soldered together.

It is well known that all metals such as tin, zinc, aluminium, bronze and even chrome may be atomized and sprayed, so that the individual articles may be made of very soft low grade materials, which may be subsequently hardened and improved and connected together by means of chrome coatings. It will moreover be possible to give the coatings different thicknesses whereby the dimensions of the parts treated may be changed quite uniformly.

In the accompanying drawings I have illustrated a device for connecting individual articles together as well as articles connected together according to my improved process. In these drawings:

Fig. 3 is a perspective view showing the use of a plurality of spraying and sanding devices.

$a$ is the well known machine for automatically manufacturing staples from wire inserted into the machine and formed into staple or U-shape on the saddle $d$ by means of the stamper $c$ operated by the cam disc $b$.

Each newly shaped staple will be removed from the shaping place by the sliding member $e$ to clear the space for the next staple, whereby a series of staples arranged close together will be formed on the saddle $d$. Said series of staples may be moved along spring blades or the like applied to the saddle $d$, whereby a lateral pressure will be produced on the staples, so that the latter will be better pressed upon each other and dressed.

Moreover the speed of the forward movement of the staples on the saddle may be varied by means of rotating friction rolls, whereby said staples will be moved forwardly with greater speed than that which is possible to obtain with the sliding member $e$.

$g$ is a sand blast serving to roughen the staples in order to secure the perfect adherence of the subsequent metal sprayed upon the staples.

The connection of the staples is effected by means of metal powder produced in the metal spraying pistol $h$ and ejected through the nozzle $i$, said metal powder being brought into contact with the moving staples through a window $k$ provided on the saddle $d$. Said window $k$ is arranged with an intermediate space corresponding to the thickness of the staples on the saddle $d$ either stationarily or adjustably. The opening of the window $k$ may be such as to permit of metallizing the staples on their entire width. However said opening may also be such that a portion only of the width of the staples will be coated with metal. According to the discharge opening of the nozzle the conical jet will be stronger or weaker so that a very fine jet of metal dust may also be obtained, adapted to spray point or dash like connecting bridges upon the staples.

Figure 1:
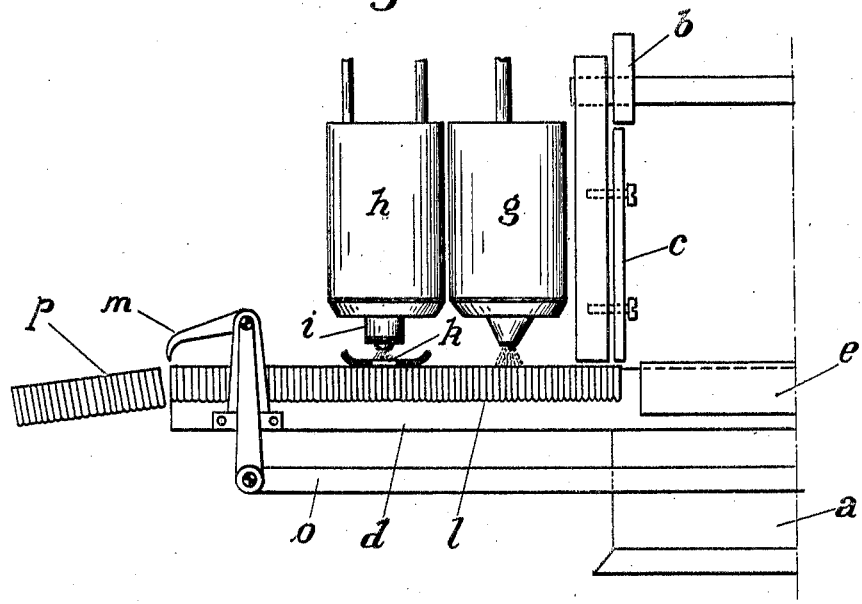
Fig. 1 is a diagrammatical side elevation of a machine for manufacturing the well known U-shaped staples for clamping purposes.

In the machine shown in Fig. 1 one spraying pistol and one sand blast are provided only. It will be obvious that a plurality of metal spraying devices operating from different sides, or pistols with a plurality of nozzles may be provided, so that the strip of staples may be metallized simultaneously on all sides as shown in Fig. 3.

The staples $l$ will be discharged from the machine in the shape of a unitary strip, from which a portion $p$ will be severed by means of a knife $m$ secured at the end of the saddle $d$, the severed portions dropping or being pushed into packing boxes placed below or suspended from said saddle.

The severing knife will be actuated either by hand or the staple manufacturing machine itself, a pivoted lever $o$ being in this case for instance in connection with the stamper $c$, actuating said lever $o$ after fifty or hundred strokes, whereby each strip of staples will contain fifty or hundred staples.

In my improved process an important feature resides in the fact that the metal sprayed upon the articles will immediately harden after being sprayed, whereby the strip of staples will not undergo any change.

According to the speed of the movement of the staples, below the spraying nozzles, the coating produced will be more or less thick, whereby it will be possible to vary the dimensions of the staples either totally or partly by simply adjusting the speed thereof.

Figure 2:
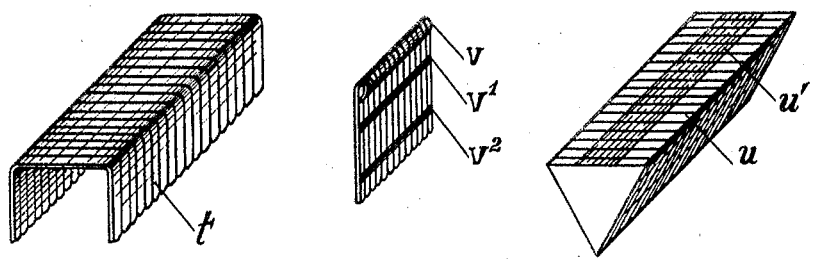
Fig. 2 shows different articles connected together according to my process.

In Fig. 2, $t$ is a strip of staples produced by means of my process and entirely coated with metal. $M$ is a stick of sheet metal chippings, such as those used for mounting or inserting window-glasses into frames. $u^1$ designates the connections of the chippings effected by means of metal sprayed upon them in the shape of a strip, whilst $v$ designates needles united by pointlike connections of the type used in clamping or stitching tools for ataching together sheets of paper and the like.

Having now fully described my said invention, what I claim and desire to secure by Letters Patent, is:

1. A machine for manufacturing individual articles such as staples and the like and connecting said individual articles together, comprising in combination a machine for manufacturing said articles, a carrier onto which the articles are delivered in advance of the machine, a sand blast and a metal spraying pistol arranged immediately after the shaping place of said machine above the carrier supporting the finished articles, and means for feeding said articles forwardly on said carrier, substantially as set forth.

2. In a machine for manufacturing individual articles such as staples and connecting said articles together, the combination with a known machine for manufacturing the desired articles and a carrier supporting the finished articles in close arrangement, of a plurality of sand blasts above said carrier, a plurality of metal spraying pistols arranged after said sand blasts above said carrier, means for feeding the finished articles forwardly on said carrier below the sand blasts and metal spraying pistols, and means for dividing the strips or sticks of articles thus produced into sections of any desired length, substantially as set forth.

3. In a machine for manufacturing individual articles such as staples and connecting said articles together, the combination with a known machine for manufacturing the desired articles and a carrier supporting the finished articles in close arrangement, of a plurality of said blasts above said carrier, a plurality of metal spraying pistols arranged after said sand blasts above said carrier, means for feeding the finished articles forwardly on said carrier, a knife mounted for swinging movement and operative in such movement to divide the articles and means for operating the knife.

KARL KAMMER.